United States Patent [19]

Levecque, deceased et al.

[11] 4,351,661
[45] Sep. 28, 1982

[54] FIBERIZATION BY GAS BLAST ATTENUATION

[75] Inventors: Marcel Levecque, deceased, late of Birchrunville, Pa.; by Marc Levecque, administrator, Paris, France; Jean A. Battigelli; Dominique Plantard, both of Rantigny, France

[73] Assignee: Isover Saint-Gobain, Paris, France

[21] Appl. No.: 244,129

[22] Filed: Mar. 16, 1981

Related U.S. Application Data

[60] Continuation-in-part of Ser. No. 102,256, Dec. 10, 1979, and Ser. No. 90,078, Oct. 31, 1979, Pat. No. 4,268,293, said Ser. No. 102,256, is a division of Ser. No. 926,954, Jul. 20, 1978, Pat. No. 4,199,338, which is a continuation-in-part of Ser. No. 834,540, Sep. 19, 1977, Pat. No. 4,145,203, and Ser. No. 762,789, Jan. 25, 1977, Pat. No. 4,102,662, said Ser. No. 90,078, is a continuation-in-part of Ser. No. 917,480, Jun. 21, 1978, Pat. No. 4,194,897, which is a continuation of Ser. No. 762,789, , said Ser. No. 762,789, is a continuation-in-part of Ser. No. 557,282, Mar. 11, 1975, Pat. No. 4,015,964, which is a continuation-in-part of Ser. No. 353,984, Apr. 24, 1973, Pat. No. 3,885,940.

[30] Foreign Application Priority Data

Feb. 19, 1981 [FR] France .................................. 81 03276

[51] Int. Cl.³ ............................................. C03B 37/06
[52] U.S. Cl. .............................................. 65/5; 65/16; 264/12; 425/7
[58] Field of Search ........................ 65/5, 16; 264/12; 425/7

[56] References Cited

U.S. PATENT DOCUMENTS

| 2,515,738 | 7/1950 | Slayter et al. | |
|---|---|---|---|
| 4,052,183 | 10/1977 | Levecque et al. | 65/3 |
| 4,102,662 | 7/1978 | Levecque et al. | 65/5 |
| 4,145,203 | 3/1979 | Levecque et al. | 65/16 |
| 4,159,199 | 6/1979 | Levecque et al. | 65/5 |
| 4,199,338 | 4/1980 | Levecque et al. | 65/16 |

Primary Examiner—Robert L. Lindsay, Jr.
Attorney, Agent, or Firm—John T. Synnestvedt; Kenneth P. Synnestvedt; Richard D. Weber

[57] ABSTRACT

Method and apparatus are disclosed for forming fibers from attenuable materials, especially mineral materials such as glass, the disclosed technique including components providing for attenuation by toration, i.e., attenuation by delivering a stream of attenuable material in attenuable condition into the zone of interaction of a gaseous jet penetrating into a larger gaseous blast. The blast, jet and means for delivery of the stream of attenuable material are disclosed in an interrelationship according to which the device for generating the blast is arranged to deliver the blast in a downwardly directed path, in which the means for generating the jet is arranged to deliver the jet laterally into the blast, in which the stream of attenuable material in attenuable condition is delivered downwardly into the influence of the jet from a delivery orifice in a position between the blast generating device and the jet generating means, and in which the orifices for both the jet and the attenuable material are spaced from the blast.

28 Claims, 11 Drawing Figures

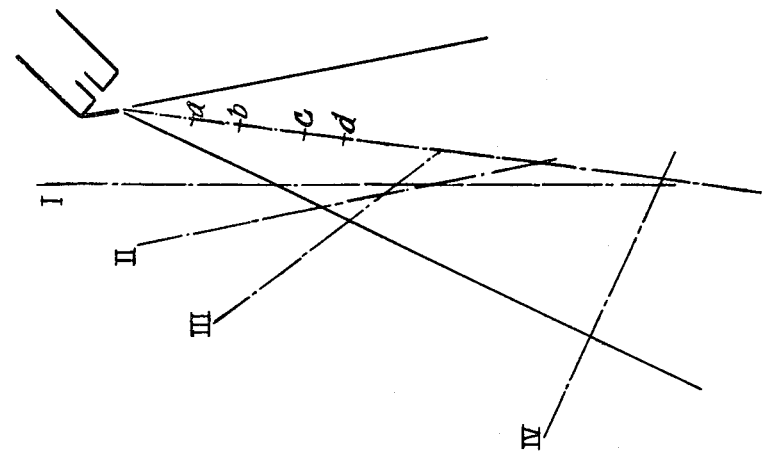
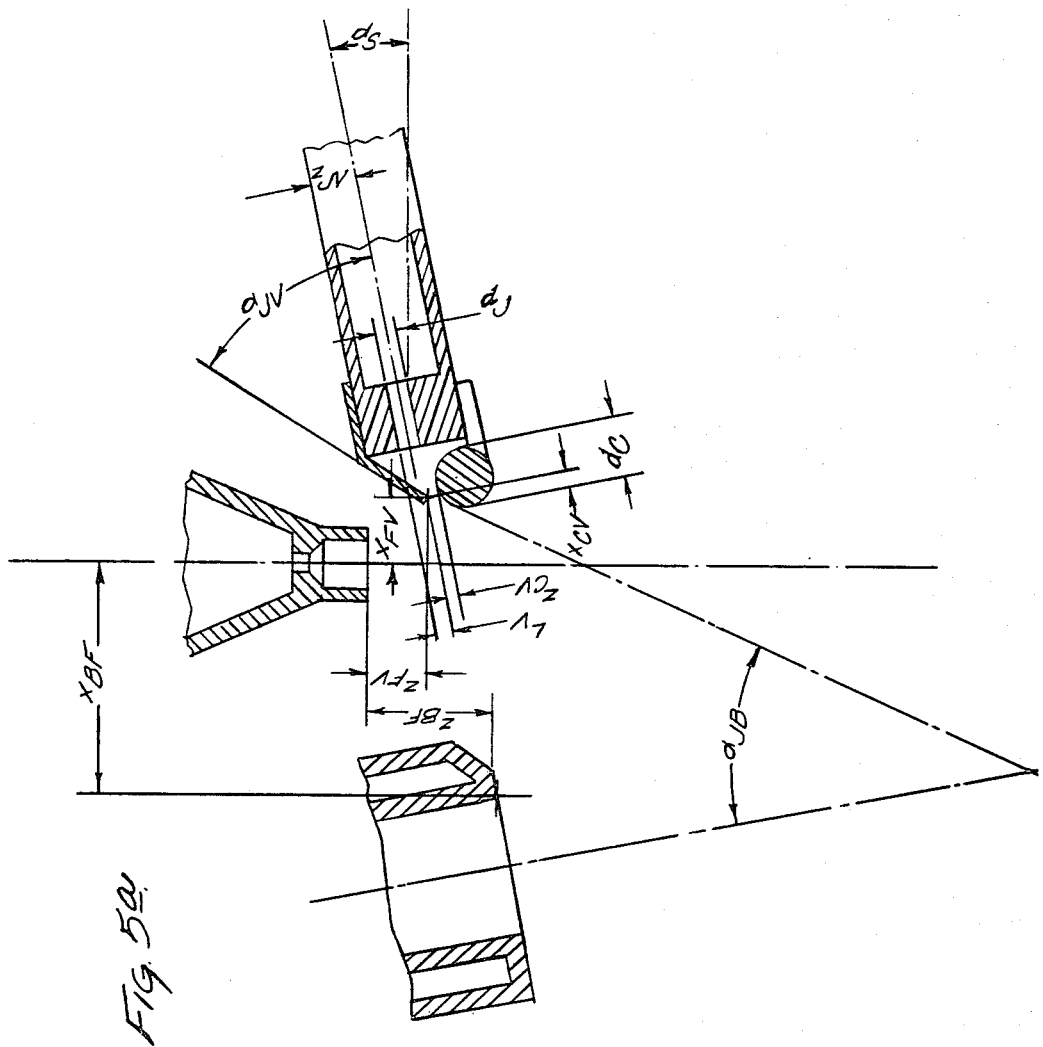

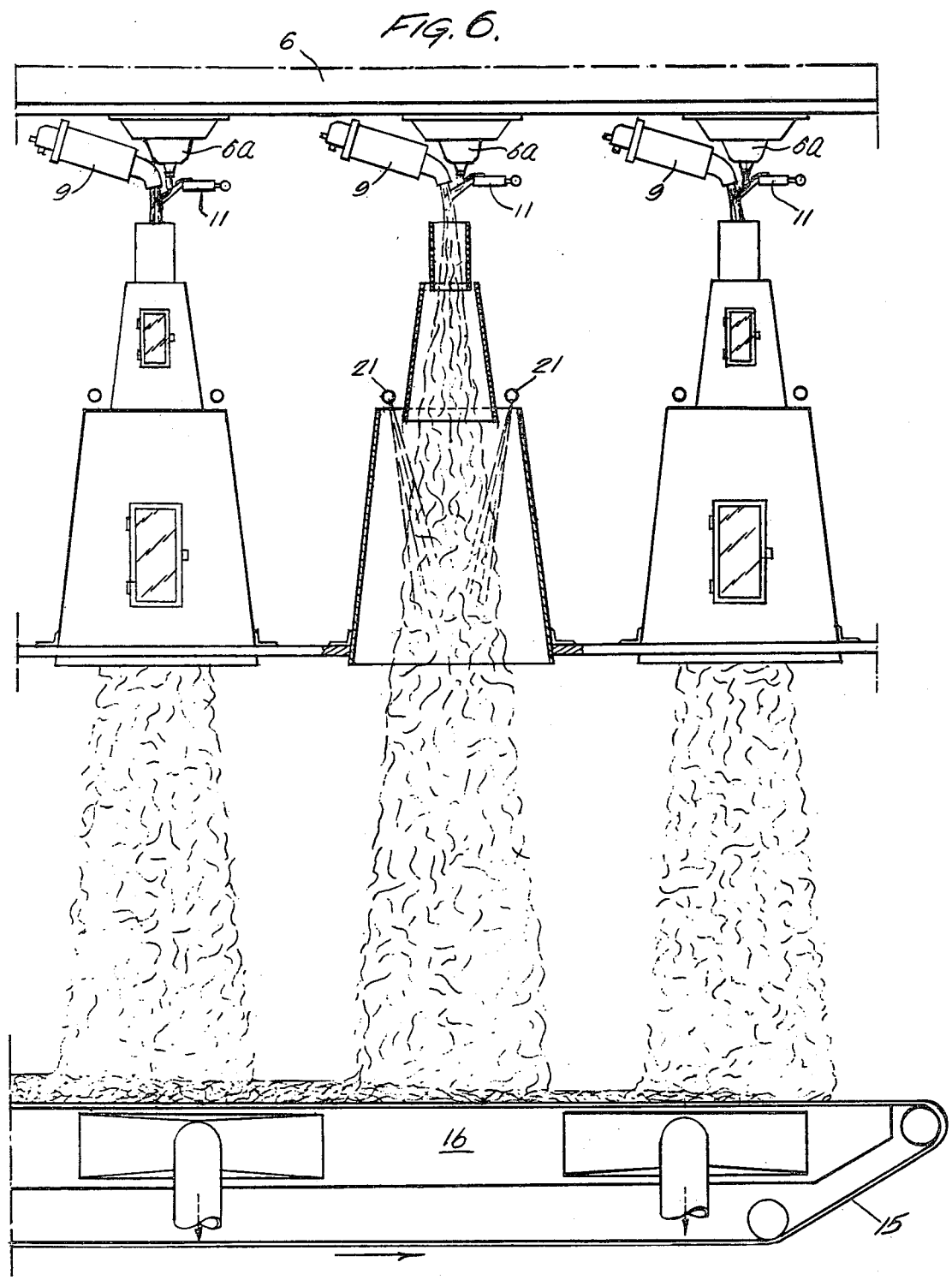

FIBERIZATION BY GAS BLAST ATTENUATION

CROSS REFERENCES

The present application is a continuation-in-part of our prior application Ser. No. 102,256, filed Dec. 10, 1979, and also of our prior application Ser. No. 90,078, filed Oct. 31, 1979, and issued May 19, 1981, as U.S. Pat. No. 4,268,293. Said prior application Ser. No. 102,256, is a division of application Ser. No. 926,954, filed July 20, 1978, which issued as U.S. Pat. No. 4,199,338 on Apr. 22, 1980, which in its turn is a continuation-in-part of our application Ser. No. 834,540, filed Sept. 19, 1977, issued Mar. 2, 1979, as U.S. Pat. No. 4,145,203, and of application Ser. No. 762,789, filed Jan. 25, 1977, issued Aug. 25, 1978, as U.S. Pat. No. 4,102,662. Said application Ser. No. 90,078 is a continuation-in-part of application Ser. No. 917,480, filed June 21, 1978, issued Mar. 25, 1980, as U.S. Pat. No. 4,194,897, which is a continuation of application Ser. No. 762,789 (now U.S. Pat. No. 4,102,662), and said application Ser. No. 762,789 is in its turn a continuation-in-part of our application Ser. No. 557,282, filed Mar. 11, 1975 (now U.S. Pat. No. 4,015,964), which in its turn is a continuation-in-part of our application Ser. No. 353,984, filed Apr. 24, 1973 (now U.S. Pat. No. 3,885,940). It is further noted that the subject matter disclosed in application Ser. No. 353,984 is also disclosed in the companion application of M. Levecque and J. Battigelli, Ser. No. 353,983 (now U.S. Pat. No. 3,874,886).

INTRODUCTION, BACKGROUND AND OBJECTS

In all of the earlier applications above referred to, there are disclosed toration techniques, i.e., techniques for fiberization of attenuable material by delivering a stream of the attenuable material in attenuable condition into the zone of interaction of a gaseous jet directed into a larger gaseous blast. All of the applications also identify various attenuable materials which may be fiberized according to the techniques disclosed; and it is pointed out that the techniques are particularly adapted to the fiberization of thermoplastic materials, especially thermoplastic mineral materials, such as glass, and reference hereinafter will frequently be made to the fiberization of glass, it being understood that other attenuable materials, such as thermoplastic organic materials, for instance poly vinyl alcohol, may be similarly fiberized.

Certain of the above prior applications also disclose arrangements providing for development of a zone of stable or laminar flow in the jet characterized by inflow of induced ambient gas (for instance air), the stream of softened or molten attenuable material being delivered into the influence of the jet in the region of the induced ambient gas entering the zone of laminar flow. In this way, the entry of the stream of attenuable material into the fiberizing center is stablized, and the stream of material is carried in the jet flow into the zone of interaction with the blast. For this purpose, prior U.S. Pat. No. 4,145,203 discloses the use of a jet guiding element introduced into the flow of the jet and having a curved surface operating as a Coanda guiding device, and which develops the desired laminar flow or stable low pressure zone in the jet into which the stream of glass is introduced. Similarly, prior U.S. Pat. No. 4,102,662 discloses a deflector plate for the same general purpose; and any of these and of similar guiding or deflecting devices, are preferably employed in the practice of the present invention.

The establishment of a zone of laminar flow with resultant induction of ambient air may alternatively be provided by employing a jet system comprising a pair of jets lying in a common plane and directed in said plane to impinge on each other at an acute angle, as disclosed in U.S. Pat. No. 4,159,199, issued June 26, 1979. The combined flow of the two jets is then directed into a blast in order to develop the desired zone of interaction and thereby effect fiberization by toration.

In considering certain of the objects and advantages of the invention, it is noted that in a typical glass fiberizing system, the means for developing and delivering the stream of molten material, frequently a glass melter or the forehearth of a glass melting furnace, is arranged with delivery orifices positioned to discharge streams of glass downwardly under the influence of gravity. It is further to be noted that in many situations, it is convenient from the standpoint of available space in the manufacturing facility, to develop a downwardly directed fiber-laden gaseous current which is intercepted by a horizontally moving perforated fiber-collecting conveyor. With these two factors in mind, the present invention utilizes a novel interrelationship of the basic components of the toration fiberizing centers, i.e., with the blast and jet generating devices preferably arranged toward opposite sides of the path of downward delivery of the streams of attenuable material. In addition, the blast generating device is preferably positioned to deliver the blast downwardly at one side of the plane of delivery of the glass streams, and the jet devices are positioned at the opposite side of said plane and are positioned to deliver the jets laterally into the blast.

The foregoing disposition of the basic components of the fiberizing centers (particularly the location of the blast and jet generating devices in positions located toward opposite sides of the plane in which the glass streams are delivered from the glass melting forehearth or other equivalent equipment) is advantageous in providing effective utilization of available plant production area and is also effective from the standpoint of convenient access to and avoidance of congestion of apparatus in the region of the fiberizing centers.

In addition to the advantages above mentioned, it is pointed out that the configuration of the fiberizing system above described, especially the downwardly directed blast and the horizontally moving fiber-collecting conveyor, provides another advantage. Thus, this configuration results in fiber lay-down on the conveyor with a high proportion of the fibers extended transversely of the plane of the fiber mat or blanket being formed. This results in production of mats or blankets having relatively high compressive strength, as is desired for many purposes, especially where board-like insulation products are being made.

In fiberizing centers with the components arranged in the manner above referred to, each stream of attenuable material is delivered into the influence of a laterally directed jet to be carried thereby into the zone of interaction of the jet with the blast. In the preferred practice of the invention, provision is made for deflecting the jet either by use of jet guiding or deflecting means or by employing twin jets, in order to establish stable laminar zones in the flow of the jets intermediate the jet orifices and the region of penetration of the jets into the blast, the streams of molten material being delivered into said laminar flow zones. In this way, fragmentation of the glass streams is avoided and stable feed is established, thereby providing for production of a single fiber in each fiberizing center.

In considering still another aspect of the present invention, attention is called to the fact that in certain configurations of the fiberizing centers employed in association with a downwardly delivered stream of molten glass, there is a tendency to develop upwardly or reversely directed currents of air in localized zones. Such currents are herein referred to as rejection currents; and in certain configurations, they tend to disrupt the normal downward feed of the glass stream, with consequent carrying of fragments of the glass upwardly and into contact with various structural parts of the fiberizing centers, such as the blast nozzle, or the jet nozzle or deflector.

In accordance with still another embodiment of the present invention, rejection currents of the kind above referred to are minimized by the employment of two different deflectors associated with the jet and arranged to jointly influence the jet flow, this multiple deflector system resulting in an increased jet deflection and also in minimizing the rejection currents.

BRIEF DESCRIPTION OF THE DRAWINGS

How the foregoing and other objects and advantages are obtained will appear more fully from the description given hereinafter with reference to the accompanying drawings in which:

FIG. 5a is a fragmentary view of the various components of the fiberizing center of FIG. 5, with indicia applied indicating various dimensional relationships between the components;

FIG. 6 is a view illustrating the positioning of a multiplicity of fiberizing centers of the kind shown in FIGS. 1 and 2, these fiberizing centers being shown arranged at stations spaced from each other along the path of travel of a fiber-collecting conveyor;

FIG. 7 is a diagram illustrating certain variations in the relation between the paths of a blast and a deflected jet;

DETAILED DESCRIPTION OF THE DRAWINGS

Figure 1:
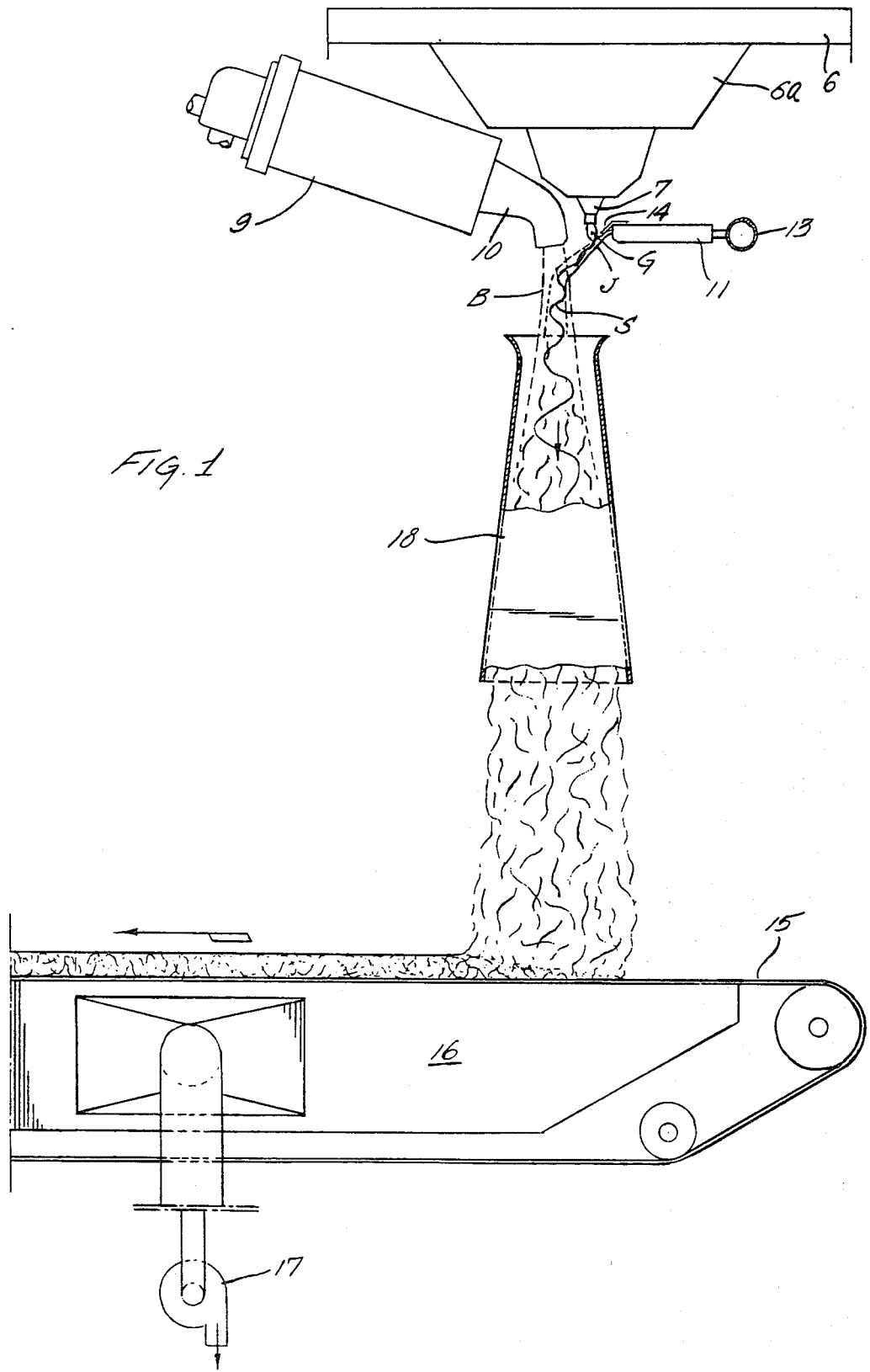
FIG. 1 is an elevational view of one embodiment with certain parts in vertical section, somewhat diagrammatically illustrating a fiberizing center arranged according to the present invention, the view also showing a collecting conveyor for the fibers produced.
Figure 2:
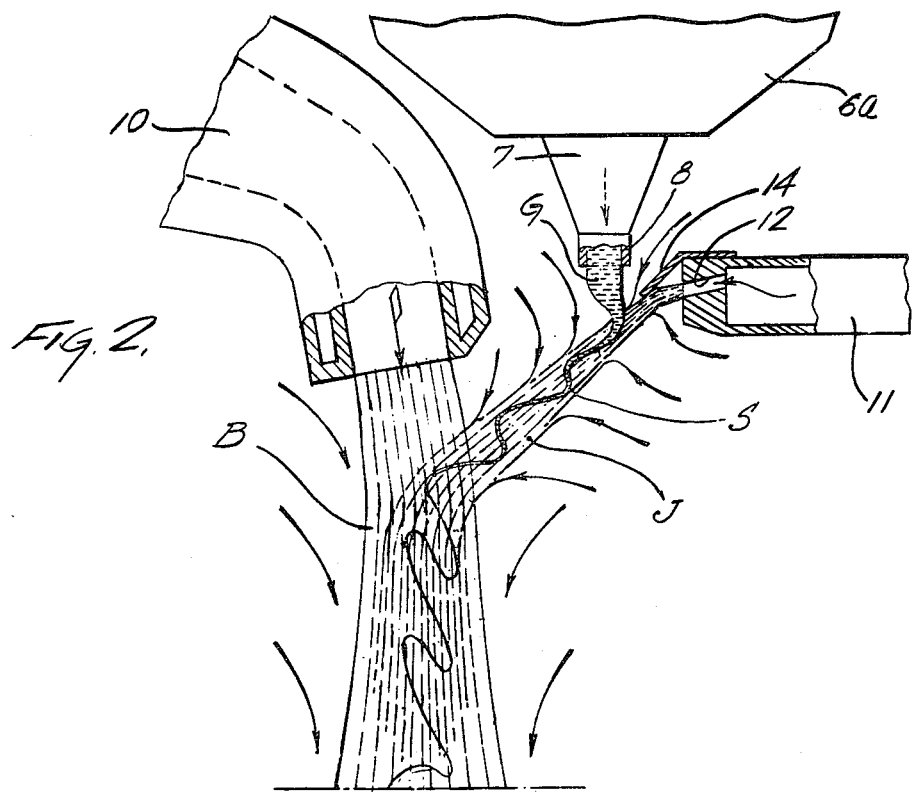
FIG. 2 is an enlarged partially sectioned elevation of the fiberizing components of the embodiment shown in FIG. 1.

Referring first to the embodiment of FIGS. 1 and 2, a forehearth is diagrammatically indicated by the reference numeral 6. A bushing 7 is supplied with glass through the feeding means indicated diagrammatically at 6a, the bushing having a plurality of glass delivery devices indicated at 8, one of these devices being partially sectioned in FIG. 2 so as to illustrate the delivery of a molten glass bulb G from which the stream S is drawn into the jet flow, as will be described hereinafter.

To the left of the glass delivery means 6a, 7, 8, as viewed in FIGS. 1 and 2, there is shown a blast generator 9 having a delivery nozzle 10 from which the blast B is discharged in a path which is downwardly directed in a manner explained more fully hereinafter. Advantageously, the blast nozzle is of substantial dimension in a plane perpendicular to the plane of the drawings, so that a given blast may serve for cooperation with a series of jets and a series of glass delivery devices cooperating with each other to form a series of fiberizing centers spaced from each other in a direction perpendicular to the plane of the drawings.

Toward the right, as viewed in FIGS. 1 and 2, a jet supply means is indicated, and in this case, a jet manifold box 11 is shown, this box having a series of jet orifices 12, one of which appears in the sectioned portion of the jet manifold box 11 in FIG. 2. Such jet manifold boxes are disclosed in the prior U.S. Pat. No. 4,102,662 above identified, each box having a multiplicity of jet orifices positioned in side-by-side relation in a direction perpendicular to the plane of the drawing. Each jet manifold box 11 may be supplied with jet fluid, for instance compressed air, from the supply line indicated in FIG. 1 at 13.

As in the toration techniques fully explained in various of the prior patents and applications above identified, the glass delivery devices 8 and the jet orifices 12 are arranged in pairs, each pair lying in a common plane, for instance in the plane of the drawing of FIG. 2. It will also be seen from FIGS. 1 and 2 that deflector means, in the form of a deflector strip 14 is arranged to project into the jet flow delivered from the orifice 12, thereby deflecting the jet downwardly, as indicated at J. In a manner fully explained in U.S. Pat. No. 4,102,662 above identified, the guiding or deflector element 14 is associated with a plurality of side-by-side jets. In such an arrangement, the adjacent deflected jets impinge upon each other and thereby develop pairs of miniature tornadoes with stable laminar flow zones between the pairs of tornadoes in the plane of each jet. These zones are characterized by low pressure, with consequent induction of ambient air, and the air induced into each stable zone tends to draw the glass stream S from the associated glass bulb G into that zone, the glass stream being advanced in the jet flow in a direction downwardly and laterally toward and into the blast. In the zone of interaction of the jet with the blast, attenuation by toration is effected, and the attenuating filament is carried downwardly in the blast flow.

The fibers developed in this manner in a plurality of the fiberizing centers are carried downwardly by the blast and are deposited on the perforated conveyor diagrammatically indicated at 15 toward the bottom of FIG. 1. This collecting conveyor has one or more suction boxes 16 arranged below the top flight of the conveyor, the suction boxes being evacuated by means of one or more blowers such as diagrammatically indicated at 17. If desired, a guide device 18 of tapered configuration, as shown in FIG. 1, may be employed in association with the downwardly moving blast in order to direct the fibers toward the underlying collecting conveyor. This device 18 would advantageously be enlarged in a plane perpendicular to the plane of the figure in order to accommodate one or more of the blasts discharged from side-by-side blast nozzles 10.

It is to be understood that in the embodiment of FIGS. 1 and 2 and also in the embodiments described hereinafter, the fiberizing centers, only one of which is represented in FIGS. 1 and 2, are preferably arranged in multiple, in side-by-side relation, with a plurality of glass delivery orifices associated with a single bushing 7 and with a similar series of jet orifices each associated with one of the glass delivery orifices, so that the blast has a multiplicity of side-by-side torsion or interaction zones created by the penetration of the several jets into the blast.

It is also contemplated, as shown in FIG. 6, that the multiple fiberizing centers associated with each bushing 7 may be duplicated with each of a plurality of bushings and blast generators, in order to provide a multiplicity of fiberizing stations or zones overlying and spaced along the collecting conveyor 15, as will be clear from examination of FIG. 6. Where the fiberizing centers are fed from an overlying forehearth such as indicated at 6 in FIG. 6, the arrangement shown provides for a multiplicity of centers underlying such a forehearth. From FIG. 6, it will also be seen that the downward discharge of the blasts facilitates the accommodation of a greater number of multiple fiberizing stations in a given distance lengthwise of the travelling conveyor 15, and also lengthwise of a forehearth, as compared with arrangements where the blast or fiber carrying currents extend from the forehearth or approach the conveyor at small angles. This is of advantage in providing for the build-up of a fiber blanket of substantial thickness within a relatively small production plant area.

Attention is further directed to the arrangement, as disclosed in FIG. 1, in which the collecting conveyor 15 travels in a horizontal path and in which the combined flow of the blast and jet is directed substantially vertically downwardly. This provides for delivery of the fibers in a path substantially perpendicular to the fiber-collecting surface of the conveyor. The resulting perpendicular approach of the fibers to the conveyor tends to maximize accumulation of fibers on the conveyor in positions extending transverse to the plane of the mat or blanket being formed. This is desirable for many purposes because it tends to increase the resistance to compression of the fibrous product.

Figure 3:
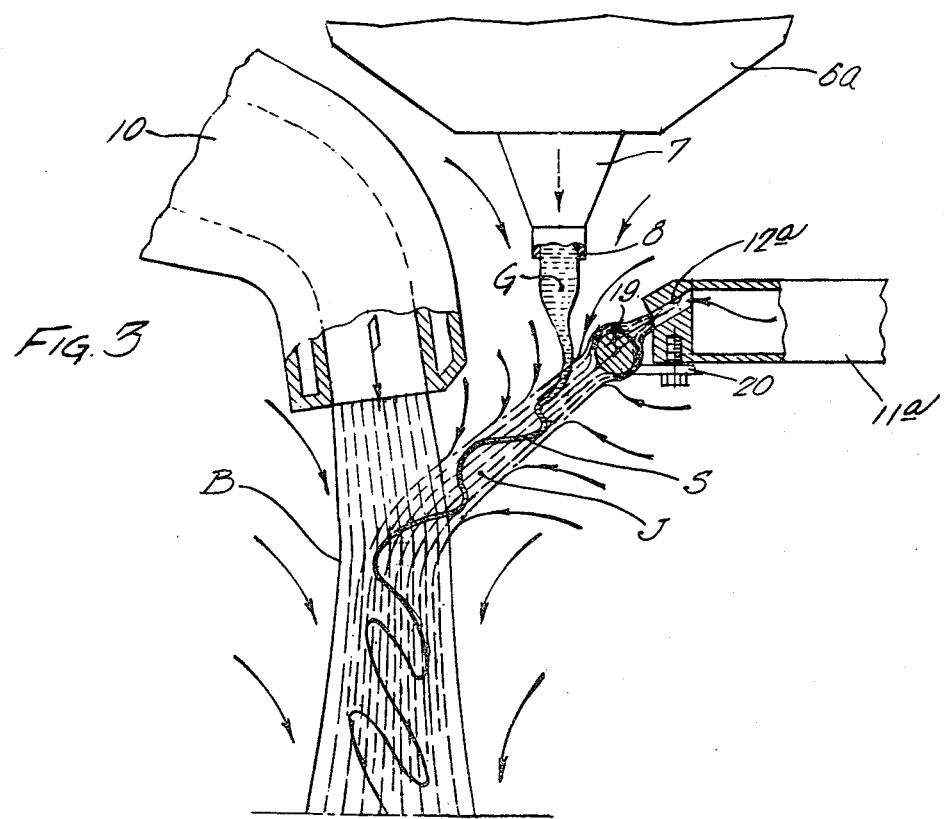
FIG. 3 is a view similar to FIG. 2 but illustrating the fiberizing components of a second embodiment.

In the embodiment shown in FIG. 3, similar reference characters are used to designate similar parts. Thus, the blast nozzle is indicated at 10, the glass bushing at 7, and a jet manifold is indicated at 11a. This manifold may be similar to that described above in connection with the first embodiment; but as will be seen in FIG. 3, the jet orifices 12a are somewhat differently positioned.

In the embodiment of FIG. 3, a Coanda type jet guiding device 19 in the form of a rod is positioned in the jet flow, the rod being mounted by brackets such as indicated at 20 on the jet manifold box 11a. This general arrangement of jet guiding device is more fully disclosed in prior U.S. Pat. No. 4,145,203 above identified. As brought out in said prior patent, the guiding element 19 may be located in a position either directly along the axes of the jet orifices or may be positioned in somewhat offset relation to the axes of the jet orifices. When the rod 19 is positioned in somewhat offset relation (as is the case in the illustration of FIG. 3), the flow of the jets downstream of the rod is deflected somewhat, as is indicated in FIG. 3. When the rod 19 is positioned in the plane of the jet axes, the flow of the jets downstream of the rod is not deflected. In either case, with appropriate spacing of adjacent jets, the jets will impinge upon each other in the region of the surface of the guide rod and will develop pairs of counter-rotating miniature tornadoes having intervening zones of stable laminar flow with high induction of ambient air, and the streams of glass are drawn into the stable laminar flow zones by the induced air, the streams being carried in the flow of the jets into the zones of interaction of the jets with the blast, thereby effecting toration, as above described.

Figure 4:
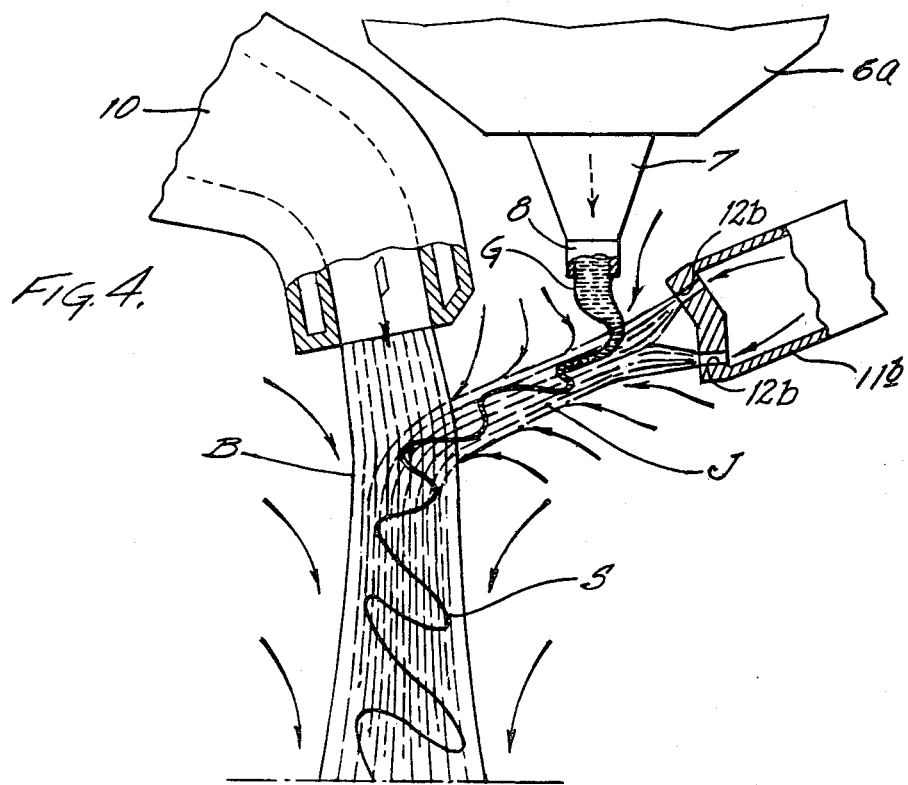
FIG. 4 is a view similar to FIGS. 2 and 3 but illustrating the components of still another embodiment of the fiberizing components.

Still another form of fiberizing center useable according to the present invention is illustrated in FIG. 4. Here again, similar reference characters are applied to similar parts. The jet box 11b is here provided with pairs of cooperating jet orifices 12b and 12b. The two orifices of each pair are oriented to have their axes in a common plane and to direct the jets toward each other at an acute angle, for instance, at an angle of about 45°. The consequent impingement of the jets upon each other develops a laminar flow zone in the region of impingement; and preferably, the jets and the glass stream delivery means 8 are relatively positioned (in a common plane) so that the glass stream enters the laminar flow zone. In this position, the induced air which is characteristic of such laminar flow zones aids in stabilizing the glass feed.

The jets of each pair in this twin jet configuration preferably have the same cross section and the same velocity and kinetic energy. This twin jet configuration and the action thereof in developing the laminar flow zone, with consequent induction of air, is described in prior U.S. Pat. No. 4,159,199, issued June 26, 1979. The combined jet flow, carrying the glass stream is directed into the blast, thereby developing the zone of interaction in the blast, with resultant attenuation of the fiber.

Figure 5:
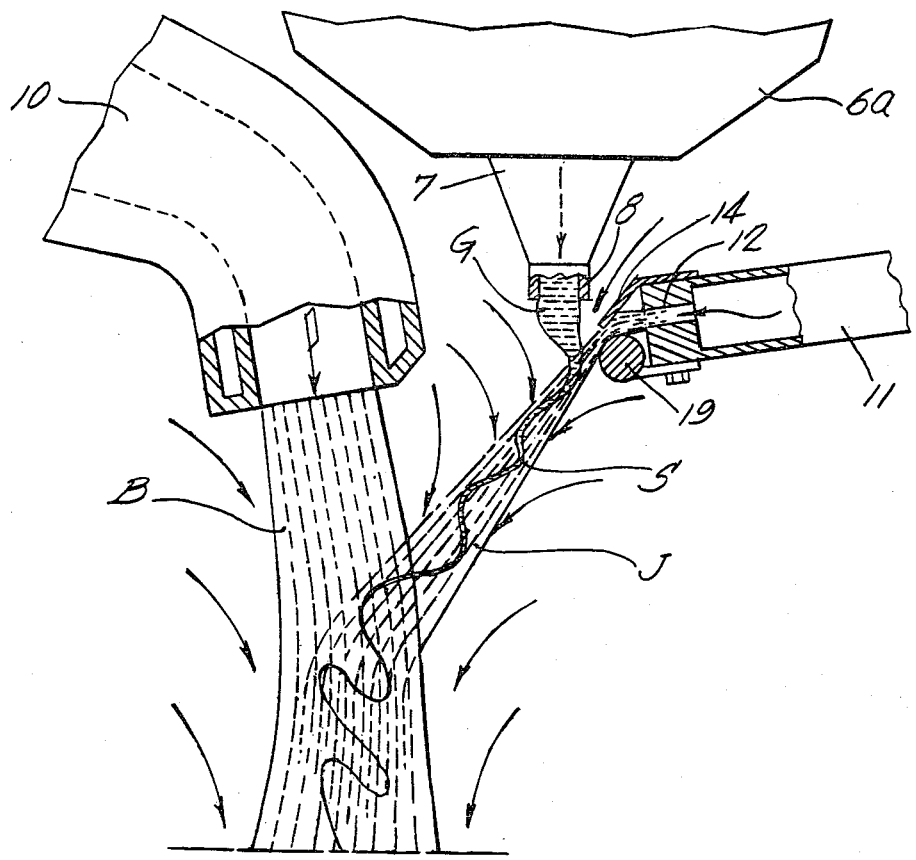
FIG. 5 is a view similar to FIGS. 2, 3 and 4, but illustrating an embodiment in which multiple jet deflectors are employed.

Still another embodiment is illustrated in FIG. 5. In this embodiment, both a deflector strip or plate 14 (as shown in FIG. 2) and also a Coanda rod element (as shown in FIG. 3) are concurrently used for jet deflection. As shown, these two deflectors are arranged to conjointly and substantially concurrently influence the jet deflection, in consequence of which a greater extent of deflection is achieved; and this has advantages in relation to the rejection currents referred to above, which have a tendency to be developed particularly in installations where the path of the jet flow in relation to the path of the blast approaches the perpendicular. In further explanation of this phenomenon, it is noted in connection with FIG. 5 (and also in connection with FIGS. 2, 3 and 4), that curved arrows have been applied at the sides of the jet J and also at the sides of the blast B, these arrows indicating the flow of air being induced by the jet and the blast. In the zone at the upper side of the jet and to the right of the blast, as viewed in any of these Figures, there are localized areas or zones where some upwardly directed or rejection currents at times have a tendency to affect the flow of the glass bulb and stream downwardly into the jet flow; and this tendency increases as the angle of the jet to the blast increases. The employment of the Coanda surface provided by the rod 19 at the lower side of the jet in combination with the deflector 14, results in increased deflection of the jet downwardly, with consequent reduction in the angle of the jet as it meets the blast. This tends to minimize the rejection currents and the consequent tendency for molten glass to be carried to the adjoining surfaces, for instance, of the blast nozzle.

Figure 5B:
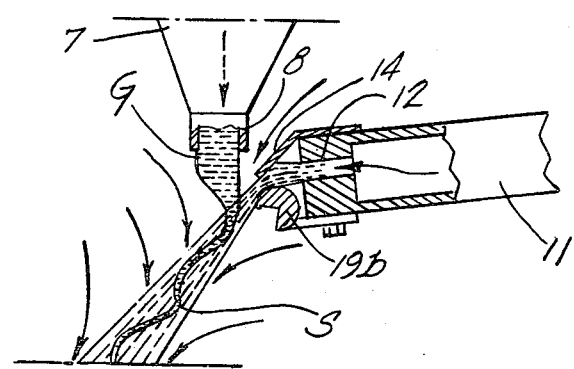
FIG. 5b is a fragmentary view of a multiple component system similar to FIG. 5 but illustrating a modified form of one of the jet deflectors.

In FIG. 5B, there is illustrated still another embodiment of a configuration of the kind shown in FIG. 5. Here the parts are the same as described above, except that the Coanda rod 19b employed has a segment cut out or removed, in order to terminate the Coanda effect on the lower side of the jet at a desired angular position around the surface of the rod.

Figure 8:
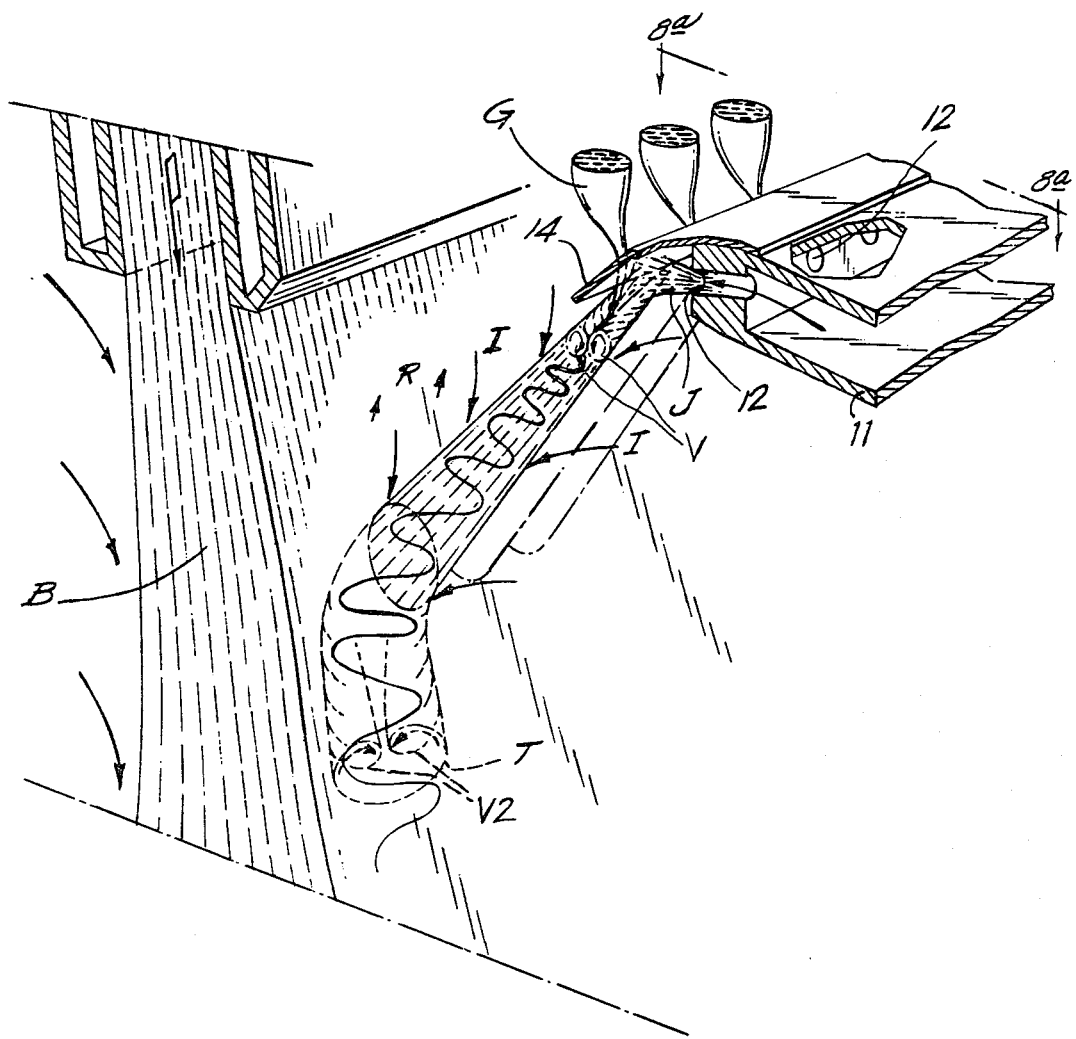
FIG. 8 is a sowmehat diagrammatic perspective view of a system of the kind shown in FIGS. 1 and 2 but further illustrating the action of the jet and blast flow.
Figure 8A:
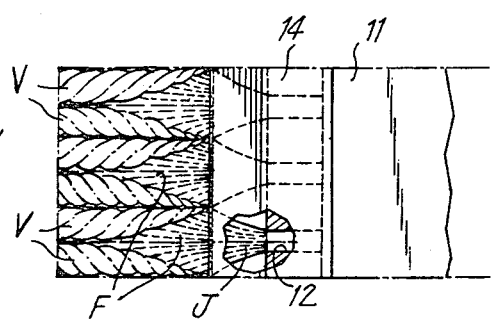
FIG. 8a is a fragmentary plan view of a portion of the jet flow in an arrangement such as shown in FIGS. 1, 2 and 8.

In further explanation of the manner of operation of the techniques herein disclosed, reference is now made to FIGS. 8 and 8a which are somewhat diagrammatic representations of the action of the jets and blast in the configuration of fiberizing centers represented by FIGS. 1 and 2. From comparison of FIGS. 2 and 8, it will be seen that FIG. 8 is a somewhat perspective and fragmentary representation of parts shown in FIG. 2; and the same reference characters have been applied. FIG. 8 diagrammatically indicates the pairs of tornadoes developed in the jet flow as a result of the deflection of the jet J by the deflecting plate 14 and the consequent impingement of the adjoining jets upon each other, these tornadoes being identified by the reference character V. Pairs of these tornadoes for several of the adjoining jets are also shown at V in FIG. 8a. As already mentioned above, the action of the deflector 14 not only results in impingement of the adjoining jets upon each other, with consequent development of the tornadoes, but also results in development of a zone of laminar flow indicated at F in FIGS. 8a, these zones being characterized by induction of air, thereby stabilizing the feed of the glass streams from the glass bulbs B.

Actually, the deflection of the jets J also develops secondary pairs of tornadoes at the lower side of the deflected jet flow, but these have not been illustrated in FIGS. 8 or 8a, in order to simplify the illustration. Such secondary pairs of jets also are of much less intensity than the upper pairs which are illustrated, as is more fully brought out in prior U.S. Pat. No. 4,145,203 above identified, which further brings out that it is the upper pair of tornadoes which exerts the controlling influence on the action of the deflected jet.

The whirling currents associated with the tornadoes V in the jet initiate attenuation of the stream of glass which enters each jet in its zone F of laminar flow, and as clearly appears in FIG. 8, the attenuating stream is carried downwardly and enters the influence of the zone of interaction of the jet and the blast B, in which an additional pair of tornadoes V2 is generated in the region indicated at T, thereby additionally attenuating the stream, in order to form a fiber which is then carried downwardly in the combined blast and jet flow.

This toration action is also described in various of the prior patents identified above.

Although the illustration of FIGS. 8 and 8a is concerned with the type of fiberizing center shown in FIGS. 1 and 2, there are similar actions involved in the operation of fiberizing centers in accordance with FIGS. 3, 4, 5 and 5b.

The employment of the Coanda rod 19 is a deflector element, as shown in FIG. 3, also results in generation of pairs of spaced tornadoes in the upper part of the jet flow, with a intervening zone of laminar flow into which the glass stream is drawn, this action being fully explained in prior U.S. Pat. No. 4,145,203, above identified. With the rod 19 positioned in the manner shown in FIG. 3, i.e., positioned so that a larger portion of the jet flow passes over the upper side of the rod, the action of the tornadoes found in the upper portion of the jet predominates, although pairs of less intense tornadoes develop in the flow at the under side of the rod, as is fully explained in the prior U.S. Pat. No. 4,145,203.

In connection with the embodiments of FIGS. 5 and 5b, it is to be noted that the development of tornadoes in the jet flow is effected by the action of the deflector 14 in the manner described above in connection with FIGS. 1, 2, 8 and 8a; but in addition, the embodiments of FIGS. 5 and 5b further result in additional deflection of the jet flow by the Coanda action of the rod 19 in FIG. 5 or 19b in FIG. 5b.

The twin jet system of FIG. 4, in which a pair of jets are directed toward each other in a common plane, also results in spreading of the jets and impingement of adjoining jets upon each other, with consequent development of zones of laminar flow in the jets, all of this action being as is fully analyzed and explained in prior U.S. Pat. No. 4,159,199 above identified.

In FIG. 8, arrows have been applied, identified by the letter I, indicating the induction of air into the flow of the jet, as the deflected jet proceeds downwardly toward the surface of the blast. In addition, in the region identified by the letter R, small upwardly directed arrows represent upwardly directed flow or rejection currents of the kind hereinabove referred to. If this type of upwardly directed rejection currents continues upwardly in the region of the glass bulbs G, and if the currents are of sufficient magnitude, fragmented portions of molten glass may be carried by such currents to the surface of the blast nozzle, or other structural parts in the region of the glass bulbs. This may result in undesired sticking of glass fragments on the structural parts.

Rejection currents of the kind above referred to have a tendency to be developed in the zone between the jet and the surface of the blast at the upper side of the jet; and this effect tends to increase with increase in the angle of the jet with respect to the blast, the perpendicular relationship normally resulting in the maximum tendency to develop rejection currents. It is, therefore, desirable to establish a path in which the deflected jet approaches the blast at a relatively low angle. Increasing the angle of deflection tends to decrease the angle at which the path of the jet approaches the blast; and this action is enhanced by employment of the combination of the deflector 14 and a Coanda element 19 or 19b, for instance in the manner shown in FIG. 5 or FIG. 5b.

Turning again to FIG. 6, it is noted that this figure illustrates a multiple station fiberizing system in which each fiberizing station is constructed in the manner of FIGS. 1 and 2 above described; but in addition, tubular guiding elements for the fibers produced are provided for the fibers originating at each station, these guiding elements being hollow and extending downwardly. The guiding elements at each station include a plurality of elements, with provision for introducing spray of fiber binder, as indicated at 21.

It will be understood that each station will comprise a multiplicity of individual fiberizing centers side-by-side in a plane perpendicular to the plane of the drawing. As will be seen from FIG. 6, the guiding elements provide an unobstructed downwardly extending path for the fibers produced at each station. It will further be observed that in the embodiment illustrated, each fiberizing path is vertically arranged and is also perpendicular to the path of travel of the collecting conveyor and also to the forehearth. These perpendicular relationships maximize the number of fiberizing stations which can be introduced in association with a given glass supply forehearth or the like and also with a common collecting conveyor. Moreover, it is also of great importance that the vertical arrangement of the combined jet and blast flow provided at each station maximizes the total number of fiberizing stations which can be established in a given area of a manufacturing plant.

As illustrated in all of the embodiments described above, it is preferred that the blast and jet generating devices be positioned toward opposite sides of the intervening glass supply means, and that the path of the blast is downwardly directed, with the jet penetrating the blast laterally. In all of these cases, the glass stream enters the jet flow before reaching the zone of interaction with the blast, and this is the preferred arrangement according to the present invention.

The configuration of the fiberizing centers with the blast and jet generating devices at opposite sides of the downwardly delivered stream of molten glass, as above referred to, and especially with the use of jet deflection as shown in most of the illustrated embodiments, is also preferred because this makes possible the spacing of the several components of the fiberizing center from each other, and thereby facilitates maintenance of the desired temperatures of the several components. In addition, since some appreciable interspacing is provided, the mounting arrangements of the components is facilitated.

In connection with the orientation of the combined flow of the jet and blast, it is to be noted that the position of said combined flow is to be considered from two standpoints, i.e., first, the position in relation to the vertical, and second, the position in relation to the path of movement of the fiber-collecting conveyor. These two relationships are separately considered just below.

First, the vertical positioning of combined flow makes possible the most effective use of production plant area, because the vertical orientation permits arrangement of a multiplicity of fiberizing centers with minimum horizontal spacing. Moreover, the vertical arrangement makes possible the accommodation of a greater number of fiberizing centers in position below a glass supply forehearth.

It will be understood, however, that the path of the combined blast and jet flow need not be exactly vertical, but preferably, should be within about 25° of the vertical position.

The second of the two relationships to be considered in connection with the path of the combined flow of the blast and jet is the positioning with relation to the path of the fiber-collecting conveyor. The perpendicular relationship has certain advantages, such as maximizing compression resistance of the mat being formed, which is useful for some purposes; and this advantage is maximized by the perpendicular relationship, regardless of whether the combined flow of the blast and jet is vertical and regardless of whether the conveyor moves in a horizontal path. It is desirable that the path of combined blast/jet flow should not be more than 45° from the perpendicular with relation to the path of the conveyor, and preferably not more than 10° or 15° from the perpendicular.

In the several embodiments illustrated, it will be noted that the blast nozzle 10 is positioned to deliver the blast at a small angle to the vertical. The nozzle is positioned in this manner because the penetration of the jets into the blast results in some deflection of the combined flow of the blast and jets from the initial path of the blast; and these relationships are to be taken into account in arranging the components to provide the desired relation of the combined flow of the blast and jets with respect to the vertical and with respect to the conveyor.

In the illustrative embodiments of equipment shown in FIGS. 1, 2, 3, 5 and 5b, deflection of jets is effected, thereby developing zones of laminar flow. This is accomplished in the embodiment of FIG. 4 by the use of a pair of jets. In each case the modified or deflected jet has a smaller cross-sectional dimension than the blast and also penetrates the blast to effect toration; and for this purpose, the jet must have kinetic energy per unit of volume greater than that of the blast. While such kinetic energy may be provided with a jet of high temperature and high velocity, high temperature and high velocity detrimentally affect guiding or deflecting elements and result in erosion and undesirable thermal expansion and contraction of such guiding and deflecting elements. When employing such elements, it is, therefore, preferred to employ jets of relatively low temperature and velocity. The lower temperature and velocity contemplated by the present invention still provides the required kinetic energy ratio between the jet and blast, i.e., a jet having kinetic energy per unit of volume higher than that of the blast so that the jet will penetrate the blast and create a zone of interaction. The reason why this desired kinetic energy ratio is still present with the lower velocity of the jet is because of the higher density of the jet which, of course, increases with decrease of temperature and since the kinetic energy is determined not by the velocity alone but also by the density of the jet fluid, a jet may readily be provided having a higher kinetic energy per unit of volume than the blast, even at velocities lower than the velocity of the blast.

By use of a jet at ambient or room temperature, it becomes feasible to employ a commonly available source of compressed air as the source of fluid for the jet. However, the jet temperature need not necessarily be as low as ambient or room temperature. Preferably the jet temperature is well below the softening point of the thermoplastic material being attenuated, and in the case of attenuation of glass or similar mineral materials, the jet temperature is preferably selected at a value below 200° C., and most desirably below 100° C.

As indicated above, the desired kinetic energy of the jet may be obtained while still utilizing a jet velocity even below the velocity of the blast. In a typical case with blast velocities of the order of 200 m/sec to 800 m/sec, which is a suitable range in the fiberization of various thermoplastic mineral materials such as glass, the jet velocity may even be substantially lower than the blast velocity.

With a blast comprising products of combustion at a temperature above about 1000° C. and a velocity in the range from about 250 m/sec to 800 m/sec, and with a jet comprising air (or a gas of similar density) at a temperature below about 100° C., the desired predominance of kinetic energy of the jet over the blast can be attained by employment of a jet velocity less than about that of the blast, for instance in the range of from about 200 m/sec to about 400 m/sec. It will be understood that the jet velocities referred to are related to the jet velocity at a point downstream of the guiding or deflecting element, as the jet approaches the blast.

Particular attention is now directed to the angular interrelationship between the blast and the jet. As above indicated, with the blast in the preferred generally vertical position, it is also preferred that the jet approach the blast at an acute angle, preferably considerably smaller than a right angle. This is of importance for a number of reasons and principally in order to avoid development of any appreciable rejection currents which tend to interfere with fiberization and tend to carry unfiberized fragments of the glass or other attenuable material upwardly and deposit such fragments on structural parts of the components of the fiberizing center.

Certain interrelationships between the jet and the blast are diagrammed in FIG. 7 in which the jet is shown as being developed and deflected in a downwardly directed path by a deflector configuration of the kind illustrated in FIGS. 1 and 2. This diagram illustrates the normal spreading of the jet at opposite sides of the axis of the deflected jet, the axis being represented by the line on which certain points are marked at a, b, c and d. These marked points represent points at which the jet has different velocities, progressively decreasing from a to d, in accordance with the following figures, which may represent relative values or meters/second:

a: 153, b: 135, c: 115, d: 108.

The lines marked I, II, III and IV represent different paths of the blast in relation to the path of the jet, each of these lines specifically representing the blast path at the boundary of the blast which is penetrated by the jet. It will be noted that the four blast boundary lines respectively approach the mean axis of the deflected jet at different angles, these angles being as follows:

I: 8°, II: 18°, III: 43°, IV: 72°.

It will further be noted from FIG. 7 that the jet boundary intersects the blast boundary lines I, II, III and IV at progressively increasing distances from the point of generation of the deflected jet.

It has been found that approximately the same level or intensity of rejection currents will result from jet and blast interrelationships of the kind referred to just above. Thus, with a jet approaching the blast at a relatively large angle, it is necessary in order to avoid excessive increase in rejection currents to shift the point of intersection of the jet with the blast boundary in a direction away from the origin of the jet, as is indicated by the blast boundary line IV. However, with decrease in the angle of approach of the jet to the blast boundary, it is possible to position the components of the fiberizing center so that the jet intersects the boundary of the blast at progressively decreasing distances from the origin of the jet, as is indicated by the position of the lines III, II and I.

Analysis of the foregoing indicates the desirability of utilizing a relatively small angle of intersection of the jet with the blast boundary. The relatively small angle of intersection is also desirable from the standpoint of effecting the penetration of the blast by the jet. As will be seen from FIG. 7, the smaller angle makes it possible to bring the jet closer to the blast; and in this case, the jet has higher velocity, as is indicated by the points marked a, b, c and d on the jet axis, and the jet will, therefore, more readily penetrate the blast.

It will be understood that in FIG. 7, the position of the lines I, II, III and IV does not necessarily represent the position in which the blast would be arranged with respect to the horizontal or the vertical, but rather the relative position of the blast and jet.

From the foregoing, it will be understood that it is desirable to establish a relatively small angle between the path of the jet and the path of the blast; and this may be achieved in accordance with the present invention in various ways, the embodiment of FIGS. 5 and 5b being particularly effective for this purpose, in view of the concurrent use of both the deflector plate and also a Coanda surface, which are respectively positioned at opposite sides of the jet and both of which have a tendency to increase the angle of deflection of the jet. This is a particularly important factor in installations where the blast is vertical or generally vertical and where the glass stream is introduced into the influence of the jet in a region between the blast nozzle and the jet nozzle.

Various parameters in the positional and dimensional interrelation of the components of the fiberizing center are identified in FIG. 5a. It is to be noted that while FIG. 5a shows a jet system incorporating both the plate and Coanda surface deflectors, a number of the positional interrelationships are applicable whether or not the Coanda surface is also present in the fiberizing center.

The following parameters are indicated in FIG. 5a:

$x_{BF}$: horizontal distance from the axis of the bushing to the closest edge of the emission orifice of the blast.

$z_{BF}$: vertical distance between the lower edge of the bushing and the adjacent edge of the emission orifice of the blast.

$x_{FV}$: horizontal distance between the axis of the bushing and the extremity of the deflector.

$z_{FV}$: vertical distance between the lower edge of the bushing and extremity of the deflector.

$a_S$: initial angle of inclination of the jet with regard to the horizontal.

$d_J$: diameter of the jet.

$z_{JV}$: distance between the axis of the jet and the upper part of the deflector measured along the perpendicular to the axis of the jet.

$l_y$: distance between the upper edge of the orifice of the jet and the extremity of the deflector measured along the perpendicular to the axis of the jet.

$a_{JV}$: angle of the deflector with regard to the axis of the jet.

$d_C$: diameter of the Coanda rod.

$x_{CV}$: distance between the extremity of the deflector and the tangent to the Coanda rod, measured in the direction of the axis of the jet.

$z_{CV}$: distance between the tangent to the Coanda rod and the extremity of the deflector measured in a direction perpendicular to the axis of the jet.

$a_{JB}$: angle of the mean direction of the jet and the blast.

Preferred ranges for the parameters referred to above are given in the table below. The distances are given in millimeters, and angles are given in degrees.

$x_{BF}$: 10–30
$z_{BF}$: 0–15
$x_{FV}$: 0–5
$z_{FV}$: 0–5
$a_S$: 0–30
$d_J$: 0.5–4
$z_{JV}$: at least 1.5

$l_V$: 0.5 $d_J$–3 $d_J$
$\alpha_{JV}$: 20–60
$d_C$: 3–20
$x_{CV}$: 0–5
$z_{CV}$: 1.5–4
$\alpha_{JB}$: 20–60

The bushing is ordinarily provided with a series of side-by-side glass delivery orifices of configuration having a lower enlargement into which a metering orifice delivers the glass, as is disclosed in various of the prior patents above identified and as shown in FIG. 5a. The metering orifice preferably has a diameter of the order of 1 to 4 mm.

Although the invention may be used with glass and various thermoplastic mineral materials of many different compositions, a few of such materials are referred to in the following table by way of example. The figures given represent percentages by weight:

|  | A | B | C | D (basalt) |
|---|---|---|---|---|
| $SiO_2$ | 46.92 | 57.00 | 63.00 | 45.32 |
| $Al_2O_3$ | 9.20 | 4.10 | 2.95 | 12.76 |
| $Fe_2O_3$ | 1.62 | 0.35 | 0.30 | 13.09 |
| CaO | 30.75 | 11.31 | 7.35 | 10.71 |
| MnO | 0.16 | | | |
| MgO | 3.95 | 3.69 | 3.10 | 10.31 |
| $Na_2O$ | 3.90 | 13.16 | 14.10 | 2.67 |
| $K_2O$ | 3.50 | 1.54 | 0.80 | 1.34 |
| BaO | | 1.60 | 2.50 | — |
| $B_2O_3$ | | 4.55 | 5.90 | — |
| $F_2$ | | 2.70 | | |
| not determined | | | | 1.00 |

For such compositions, the temperature of the bushing is advantageously established between 1300° and 1600° C. and preferably from 1400° to 1500° C. The temperature of the attenuable material at the exit of the bushing is advantageously between 1200° and 1500° C. (for viscosities varying between 30 and 100 po).

For most purposes, the blast is advantageously constituted by a combustion gas, in particular the combustion products of natural gas and air. Its temperature is advantageously between 1300° and 1800° C. and is preferably around 1500° C.

The depth of the blast emission orifice determines that of the blast. In practice, a depth from 5 to 25 mm provides a sufficiently deep blast. The width of the emission orifice should be a function of the number of streams of material to be drawn by the same blast. This width can reach and exceed 600 mm. The only limits to the number of streams of material treated by the same blast are practical considerations. Beyond a certain limit, the higher this number is, the more difficult it is to maintain identical conditions over the entire width.

The pressure in the blast at the exit of the emission orifice is ordinarily not very elevated. The relative dynamic pressure ordinarily does not exceed $50-10^3$ Pascal and preferably not $25-10^3$ Pascal.

The following specific examples will illustrate operations performed respectively by fiberizing centers constructed according to FIGS. 2 and 5.

EXAMPLE I

In this example, an apparatus such as that shown in FIG. 2 was used. Composition D (basalt) glass was fiberized under the following conditions:
 temperature of the bushing—1400° C.
 diameter of the bushing orifices—2.4 mm
 output/day/orifice—55 kg
 temperature of the blast—1500° C.
 speed of the blast—580 m/s
 dynamic pressure of the blast—33,000 Pa
 temperature of the jet—20° C.
 speed of the jet—330 m/s
 pressure of the jet—$25 \times 10^5$ Pa.

The placement of the various elements and their dimensions are as follows. The symbols are identical to those presented in FIG. 5a.

| $x_{BF}$ | 24 mm | $d_J$ | 1.5 mm |
|---|---|---|---|
| $z_{BF}$ | 8 mm | $z_{JV}$ | 2.5 mm |
| $x_{FV}$ | 2 mm | $\alpha_{JV}$ | 45° |
| $z_{FV}$ | 1.5 mm | | |
| $\alpha_S$ | 16° | $l_V = 2 \times d_J$ | = 3 mm |

The fibers obtained have a micron size of about 5 sub 5 g, that is to say of which the average diameter is on the order of 6μ.

In the conditions indicated, it it noted that the average jet deflection with regard to its initial direction is about 52°. The influence of the deflector dimensions on the deflection angle is especially significant. If instead of having $l_V = 2\ d_J$, a shorter deflector is used corresponding to $l_V = \frac{3}{4}\ d_J$, the other parameters remaining identical, the mean jet deflection would be no more than about 35°.

The value of the average deflection is not necessarily in accordance with the expansion of the jet in the plane of the figure. This expansion which is systematically produced is modified by the presence of the deflector. In the case considered, a slightly smaller expansion is observed for the longest deflector ($l_V$).

The expansion of the jet in the present case nevertheless remains limited; and at the highest point, the angle of the jet and the blast $\alpha_{JB}$ is on the order of 57°.

EXAMPLE 2

This example uses the same conditions as those of Example 1 concerning the attenuable material and the characteristics of the jets and the blast.

However, the apparatus used in Example 2 is that of FIGS. 5 and 5a. The placements and dimensions are the same as above, with the exception of the values relative to the jet, which are different because of the presence of the Coanda rod in the deflection and jet modification means. The values are as follows:

| $x_{BF}$ | 18 mm | $d_J$ | 1.5 mm |
|---|---|---|---|
| $z_{BF}$ | 8 mm | $z_{JV}$ | 2.5 mm |
| $x_{FV}$ | 2 mm | $\alpha_{JV}$ | 45° |
| $z_{FV}$ | 1.5 mm | $d_C$ | 6 mm |
| $\alpha_S$ | 5° | $x_{CV}$ | 2.5 mm |
| | | $z_{CV}$ | 2.5 mm |
| | | $l_V = 1 \times d_J$ | = 1.5 mm |

The fibers obtained under these conditions have a micron size on the order of 4 sub 5 g, and an average diameter of 5μ.

The average deflection of the jet with regard to its initial direction is about 74°. This total deflection is, therefore, clearly more significant than with the deflector alone, as in Example 1, although the deflector is shorter (1 $d_J$ instead of 2 $d_J$).

Even with this great deflection, the jet penetrates the blast well, and the angle $\alpha_{JB}$ of the jet and the blast at the highest point is no more than 33°, which considerably decreases the risk of disturbance caused by rejection currents.

This arrangement is also somewhat more advantageous from the point of view of the energy yield per unit of weight of fiber produced.

The results obtained in the framework of the two preceding examples are comparable with those obtained by the prior toration processes effected with a "horizontal" arrangement, if only the fiber produced is considered. When compared to these previous processes, as has already been pointed out, the advantages of the invention are of another nature. They concern in particular the gain of space along the fiberizing path; and, consequently, the possibility of either increasing the number of fiberizing stations in a given length, or of decreasing the length for the same number of stations.

As compared with toration type arrangements with "horizontal" blasts, the gain of space is between about 50 and 70%.

This reduction occurs in the dimensions of the receiving chamber, in the amount of air ventilated, etc., and in summary, by the more economic operating conditions.

We claim:

1. A method for making a fibrous mat of fibers formed from attenuable material, comprising directing a gaseous blast in one path, directing a gaseous jet in a path extended transverse to the path of the blast, the jet having a transverse cross-sectional dimension smaller than that of the blast but having kinetic energy per unit of volume greater than that of the blast to provide for penetration of the jet into the blast and thereby develop a zone of interaction of the jet in the blast, the jet flow thereby also merging with the blast flow, forming a stream of attenuable material in attenuable condition in a region between the blast and the jet, delivering said stream downwardly into the influence of the jet, into said zone of the interaction and thereby effect fiberization of said stream in the blast, and collecting formed fibers on a travelling fiber-collecting surface.

2. A method for making a fibrous mat of fibers formed from attenuable material, comprising directing a gaseous blast in one path, directing a gaseous jet in first path extended transverse to the path of the blast, deflecting the jet from said first path into a second path extended transverse to path of the blast, said second path being extended toward the blast at a smaller angle to the path of the blast than said first jet path, the deflected jet having a transverse cross-sectional dimension smaller than that of the blast but having kinetic energy per unit of volume greater than that of the blast to provide for penetration of the deflected jet into the blast and thereby develop a zone of interaction of the jet in the blast, the jet flow thereby also merging with the blast flow, delivering a stream of attenuable material in attenuable condition into the influence of the jet, into said zone of interaction thereby effect fiberization of said stream in the blast, and collecting formed fibers on a travelling fiber-collecting surface.

3. A method as defined in claim 2 in which the jet flow is characterized by a zone of laminar flow into which ambient gas is induced and further in which the stream of attenuable material is delivered into the influence of said induced gas to be carried thereby into the zone of laminar flow of the jet and thus into the jet flow to be carried thereby into said zone of interaction with the blast.

4. A method as defined in claim 1 and further including developing a pair of counter-rotating tornadoes in the jet flow with consequent induction of ambient gas in a zone between the tornadoes, the stream of attenuable material being delivered into said zone of the jet between the tornadoes and being carried by the jet into the zone of interaction with the blast.

5. A method as defined in claim 4 in which the pair of counter-rotating tornadoes are developed by deflecting the path of flow of the jet.

6. A method as defined in any one of claims 1 to 5 in which the fiber-collecting surface travels in a substantially horizontal direction.

7. A method for making a fibrous mat of fibers formed from attenuable material, comprising directing a gaseous blast in one path, directing a gaseous jet in a path extended transverse to the path of the blast, the jet having a transverse cross-sectional dimension smaller than that of the blast but having kinetic energy per unit of volume greater than that of the blast to provide for penetration of the jet into the blast and thereby develop a zone of interaction of the jet in the blast, the jet flow thereby also merging with the blast flow, forming an unconfined stream of attenuable material in attenuable condition in a region between the blast and the jet, delivering said stream downwardly into the influence of the jet to be carried thereby into said zone of interaction and thereby effect fiberization of said stream in the blast, and collecting formed fibers on a travelling fiber-collecting surface.

8. A method for forming a fibrous mat on a horizontally travelling fiber-collecting surface, comprising directing a gaseous blast from a first zone above and toward said surface, directing a gaseous jet from a second zone offset toward one side of and directed toward the blast, the jet being of smaller transverse cross section than that of the blast and having higher kinetic energy than the blast to thereby penetrate into and merge with the blast flow, and from a third zone intermediate said first and second zones delivering a stream of attenuable material into the influence of the jet in a region upstream of the penetration of the jet into the blast to be carried by the jet into the blast and thereby effect fiber attenuation in the blast, with consequent delivery of the fibers by the blast downwardly to the fiber-collecting surface, the blast and jet being directed so that the merged flow thereof is directed downwardly within about 15° of a position perpendicular to the collecting surface.

9. Equipment for making a fibrous mat of fibers formed from attenuable material, comprising a blast discharge device positioned to deliver a gaseous blast in one path, jet means developing a gaseous jet having a transverse cross-sectional dimension smaller than that of the blast and directed in a path extended transverse to and penetrating the blast, thereby developing a zone of interaction of the jet in the blast and merging with the blast flow, means for introducing attenuable material into said zone of interaction for fiberization therein including supply means for delivering an unconfined stream of attenuable material in attenuable condition into the influence of the jet in a region between the blast device and the jet means, and a fiber-collecting conveyor travelling in a path intercepting the blast, the paths of the conveyor and of the merged jet and blast flow being angularly separated from each other at an angle within about 45° at opposite sides of the perpendicular.

10. Equipment for making a fibrous mat of fibers formed from attenuable material, comprising a blast discharge device positioned to deliver a gaseous blast in one path, jet means developing a gaseous jet having a transverse cross-sectional dimension smaller than that of the blast and directed in a path extended transverse to and penetrating the blast, thereby developing a zone of interaction of the jet in the blast and merging with the blast flow, means for introducing a stream of attenuable material in attenuable condition into the jet to be carried thereby into said zone of interaction for fiberization therein, and a fiber-collecting conveyor travelling in a path intersecting the path of discharge of the blast from the blast discharge device, said paths of the conveyor and of the merged blast and jet flow intersecting at an angle within a range of about 15° from the perpendicular.

11. Equipment for making fibers from attenuable material, comprising supply means for delivering an unconfined stream of attenuable material in attenuable condition in a downwardly directed path, a blast discharge device for delivering a downwardly directed gaseous blast, and jet means for developing a gaseous jet having a transverse cross-sectional dimension smaller than that of the blast and directed in a path extending laterally toward and penetrating and merging with the blast, the blast discharge device and the jet means being positioned toward opposite sides of the downwardly directed path of the stream of attenuable material, and the supply means being positioned to deliver the stream of attenuable material to the jet in a region upstream of the penetration of the jet into the blast.

12. Equipment as defined in claim 11 and further including a fiber-collecting conveyor in the path of the blast for receiving the attenuated fibers in the form of a fibrous mat.

13. Equipment as defined in claim 12 in which the conveyor has a fiber-receiving surface travelling in a path angularly separated from the path of the merged flow of the jet and blast at an angle within about 15° at opposite sides of the perpendicular.

14. Equipment as defined in claim 12 and further including an open ended tubular fiber guiding device between the blast discharge device and the collecting conveyor.

15. Equipment for making fibers from attenuable material, comprising supply means for delivering an unconfined stream of attenuable material in a downwardly directed path, a blast discharge device for delivering a downwardly directed gaseous blast, jet gas supply means having an orifice for delivery of a gaseous jet, and jet guiding means positioned along the path of said gaseous jet for establishing a zone of stable flow characterized by induction of ambient gas, the guided jet flow having a transverse cross-sectional dimension smaller than that of the blast and the guiding means being positioned to deliver the guided jet flow in a path extended laterally toward and penetrating the blast, the blast discharge device and the jet gas supply means being spaced from and positioned toward opposite sides of the downwardly directed path of the stream of attenuable material, and the material supply means being positioned to deliver the stream of attenuable material into said stable zone of the jet.

16. Equipment as defined in claim 15 in which the jet guiding means comprises a deflector having a jet deflecting surface interposed in at least a part of the jet delivered from the jet orifice.

17. Equipment as defined in claim 15 in which the jet guiding means comprises a guiding element having a convexly curved surface positioned to influence the jet flow by Coanda action.

18. Equipment as defined in claim 17 in which the convexly curved guiding element is positioned to provide for deflection of the path of the jet.

19. Equipment as defined in claim 15 in which the jet guiding means comprises a concavely curved trough-like element with one end positioned to receive the jet and with the other end positioned to deliver the jet in a path directed toward the blast.

20. Equipment as defined in claim 15 and further including a fiber-collecting surface travelling in a path intercepting the path of the blast flow downstream of the region of penetration of the jet into the blast, the path of the jet being angularly separated from said path of the blast flow at an angle within about 15° at opposite sides of the perpendicular.

21. A process for fiberizing a thermoplastic material by means of gaseous attenuation, including generating a gaseous blast and at least one gaseous jet directed toward the blast, the gaseous jet having a smaller transverse cross-section than that of the blast and a greater kinetic energy per unit of volume than that of the blast so that the jet penetrates the blast and forms a zone of interaction, establishing a stream of attenuable material, said stream being issued from a source of attenuable material from which it is flowed by gravity into contact with the jet before the latter penetrates the blast, the combined flow of the jet and blast being oriented downwardly in a path lying within about 25° from the vertical.

22. Equipment for making mineral fiber mat comprising a foraminous fiber-collecting conveyor moving in a substantially horizontal path, suction means below the conveyor, and means for fiberizing molten mineral material spaced above the conveyor, characterized in that the fiberizing means comprises a blast generator above the conveyor and having a blast orifice directed downwardly into an unobstructed path to the conveyor for delivering a blast directly against the upper surface of the conveyor, means for generating a plurality of gaseous jets directed in paths intercepted by the blast, and a source of the molten material with orifice means providing for delivery of streams of molten material into the jets in zones spaced from the interception of the jets by the blast, the jets having greater kinetic energy than the blast per unit of volume and thereby penetrating the blast and developing zones of interaction in the blast above the conveyor, with resultant fiberization of the streams of molten material in the zones of interaction and deposit of the formed fibers in the form of a mat on the conveyor.

23. Equipment for making mineral fiber mat comprising a blast generator having a downwardly directed blast orifice, means for generating a plurality of gaseous jets, a jet deflector element in the path of the jets with resultant spreading and impingement of the jets on each other and with development of laminar zones, the deflector element being positioned to direct the jets into paths intercepted by the blast, the deflected jets each being of smaller transverse cross section than that of the blast and penetrating the blast to develop zones of interaction of the jets and blast, and a source of the molten material with orifice means providing for delivery of streams of the molten material into the deflected jets in the zones of laminar to be carried by the deflected jets into said zones of interaction in the blast with resultant fiberization of the streams of molten material in the zones of interaction.

24. Equipment as defined in claim 23 in which the orifice means for delivery of the streams of molten material is positioned intermediate the blast generator and the means for generating the jets.

25. Equipment as defined in claim 24 in which the deflector element comprises a deflector plate extended along a group of the jets.

26. Equipment for making a fibrous mat of fibers formed from attenuable material, comprising a blast discharge device positioned to deliver a gaseous blast in one path, jet means developing a pair of jets directed in intersecting paths lying in a common plane and with the combined jet flow directed in a path extended transverse to and penetrating the blast, the combined jet flow being of transverse cross section smaller than that of the blast thereby developing a zone of interaction of the jet in the blast and merging with the blast flow, means for introducing a stream of attenuable material in attenuable condition into the combined jet flow to be carried thereby into said zone of interaction for fiberization therein and a fiber-collecting conveyor travelling in a path intersecting the path of discharge of the blast from the blast discharge device, said paths of the conveyor and of the merged blast and jet flow intersecting each other, the blast discharge device and the jet means being positioned to develop a merged flow in a path lying within about 25° from the vertical.

27. Equipment for making mineral fiber mat comprising a blast generator having a downwardly directed blast orifice, means for generating a plurality of gaseous jets directed in paths transverse to the path of the blast, means for deflecting and spreading the jets sufficiently to cause them to impinge upon each other and thereby generate pairs of tornadoes with an intervening zone of laminar flow in each jet, the means for deflecting the jets being arranged to direct the deflected jets into paths intercepted by the blast, and a source of the molten material with orifice means providing for delivery of streams of the molten material between the blast generator and the means for generating the jets, the orifice means being positioned to deliver said streams into the laminar zones of the deflected jets upstream of the interception of the jets by the blast, the deflected jets having greater kinetic energy than the blast per unit of volume and thereby penetrating the blast and developing zones of interaction in the blast, with resultant fiberization of the streams of molten material in the zones of interaction.

28. A method according to claim 2 in which the stream of attenuable material is delivered into the deflected jet flow to be carried thereby into the zone of interaction.

* * * * *